United States Patent [19]

Gruetzmacher

[11] Patent Number: 5,138,759
[45] Date of Patent: Aug. 18, 1992

[54] CUTTING GUIDE AND METHOD OF MAKING

[75] Inventor: Richard J. Gruetzmacher, Menomonee Falls, Wis.

[73] Assignee: Johnson Level & Tool Mfg. Co., Mequon, Wis.

[21] Appl. No.: 737,704

[22] Filed: Jul. 30, 1991

[51] Int. Cl.$^5$ ............................................. B27B 9/04
[52] U.S. Cl. ...................... 29/467; 29/525.1; 33/403; 83/698; 83/745; 269/47; 403/297; 403/402
[58] Field of Search ............ 29/464, 467, 468, 525.1; 33/403, 452, 478, 430, 443; 83/180, 182, 698, 699, 745; 269/47, 49, 254 R, 1; 403/292, 297, 402

[56] References Cited

U.S. PATENT DOCUMENTS

| | | |
|---|---|---|
| 3,915,045 | 10/1975 | Kitzman . |
| 4,075,920 | 2/1978 | Neal ........................ 83/745 |
| 4,176,572 | 12/1979 | Pennington ............ 83/745 X |
| 4,244,118 | 1/1981 | Matuszak ............... 83/745 X |
| 4,381,103 | 4/1983 | Ferdinand et al. . |
| 4,463,644 | 8/1984 | Ferdinand et al. . |
| 4,736,523 | 4/1988 | Hanning ................ 83/745 X |
| 5,035,061 | 7/1991 | Bradbury ............... 83/745 X |

Primary Examiner—Timothy V. Eley
Attorney, Agent, or Firm—Andrus, Sceales, Starke & Sawall

[57] ABSTRACT

A cutting guide assembly consists of a pair of guide rails in end-to-end abutting relationship with a clamping plate frictionally engaging each guide rail to secure the rails together. Each guide rail has a cross section defining a channel. A ramped or inclined lip is disposed within the channel, and is engaged by the end of a flange provided on the clamping plate to force the flange toward an inwardly facing stop surface defined by a wall of the guide rails. A series of set screws provide relative downward movement of the clamping plate, to cause the end of the flange to ride on the inclined surface and to force an outwardly facing surface of the flange against the stop surfaces of the guide rails. In this manner, the vertical guide surfaces of the guide rails are automatically aligned with each other when the rails are secured together. The clamping plate includes a second flange, which engages a supporting surface formed on a second inwardly extending lip. The second flange member moves along the supporting surface during tightening down of the clamping plate, to accommodate the other flange riding along the inclined surface.

10 Claims, 1 Drawing Sheet

U.S. Patent     Aug. 18, 1992     5,138,759
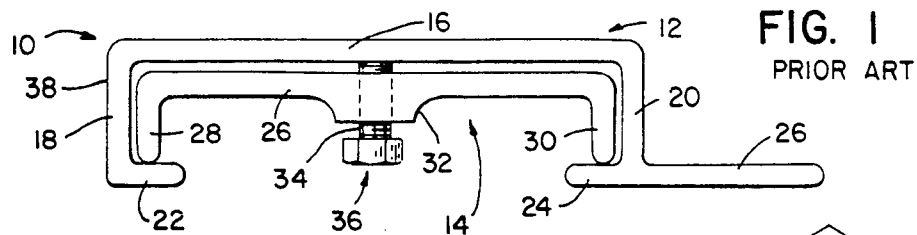
FIG. 1
PRIOR ART
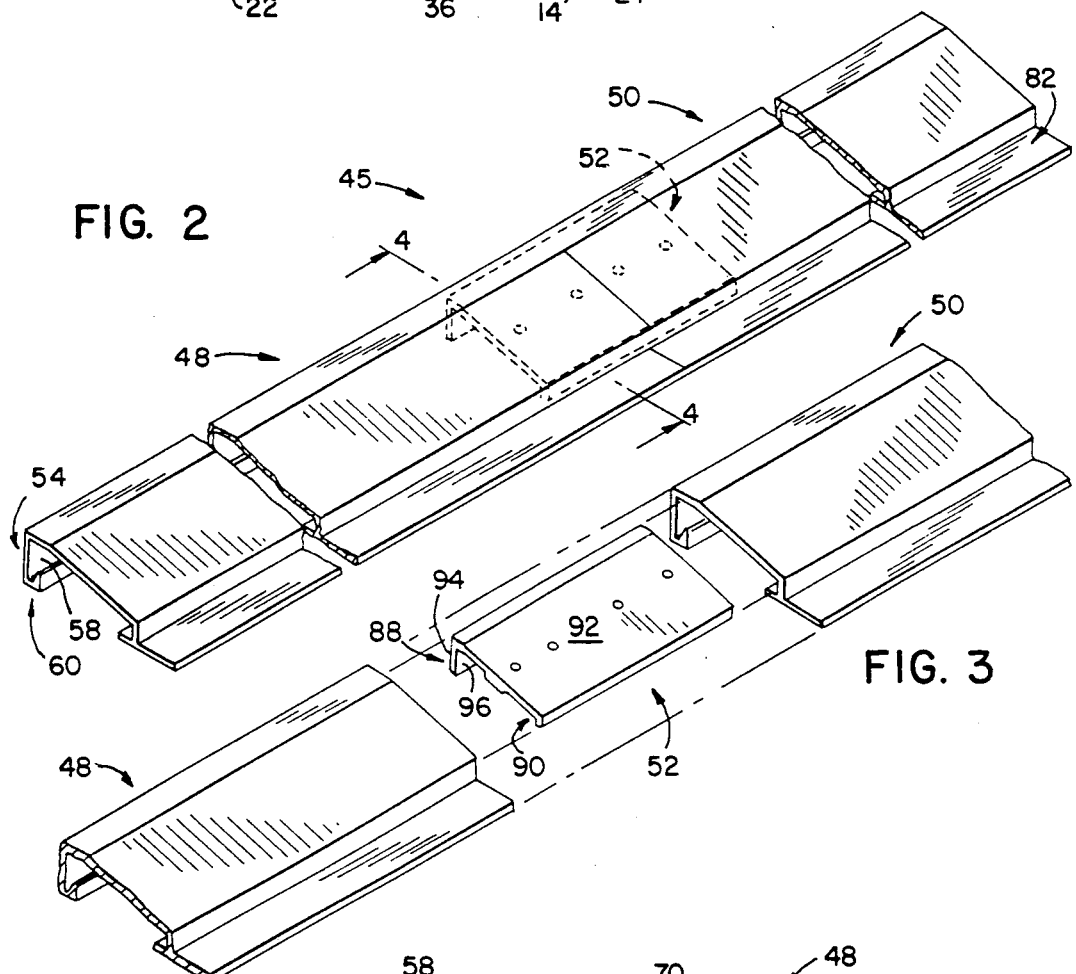
FIG. 2
FIG. 3
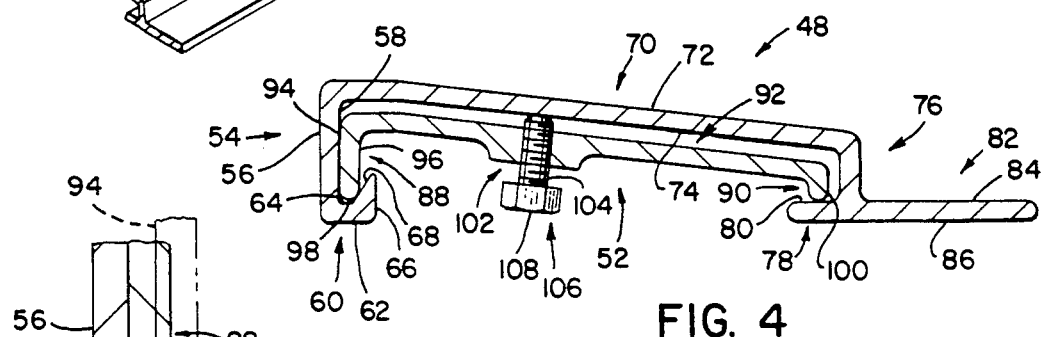
FIG. 4
FIG. 5

CUTTING GUIDE AND METHOD OF MAKING

BACKGROUND AND SUMMARY

This invention relates to hand tools, and more particularly to a device known as a cutting guide or straight edge guide, for use in connection with a workpiece, to mark or cut in a straight line on the workpiece.

Various forms of cutting guides or straight edge guides are known, and reference is made to U.S. Pat. No. 4,463,644 to Ferdinand et al and U.S. Pat. No. 3,915,045 to Kitzman for examples of such devices. Generally, cutting guides of the type disclosed in the noted patents consist of a pair of rails, each of which has a straight guide edge, with the rails being joined together to form a continuous guide edge having sufficient length to span the length of an eight-foot workpiece, such as a conventional 4' by 8' sheet of plywood or paneling. Other low-cost cutting guides are known, as will be set forth in detail hereafter.

It is an object of the present invention to provide a cutting guide consisting of a pair of guide rails, in which the rails are relatively inexpensive to produce yet provide a reliable guide edge and sufficient strength to maintain the straightness of the cutting guide even after repeated use. It is a further object of the invention to provide a cutting guide in which the guide rails are connected in a simple and efficient manner, with the connection insuring that the vertical guide edges of the rails are aligned with each other by the action of the rails being connected together.

In accordance with the invention, a cutting guide consists of a pair of guide rails, each of which defines a guide wall. The guide rails are adapted for placement in an end-to-end relationship such that outer surfaces of the guide walls cooperate to form a continuous straight guide edge. Each rail defines a channel, including a ramped surface and a stop surface disposed within the channel. A clamp member is adapted for placement within the first and second guide rail channels. The clamp member includes a first portion engageable with the ramped surface of each rail, and a second portion engageable with the stop surface of each rail. A series of engagement members, such as threaded screws, are interconnected with the clamp member, with at least one screw engaging each one of the guide rails. Engagement of the guide rails by the screws results in movement of the clamp member first portion along the ramped surfaces of the rails until engagement of the clamp member second portion with the stop surfaces of the rails. In this manner, the first and second guide rails are securely held together, and the outer surfaces of the first and second guide walls are aligned to form a continuous straight guide edge.

The ramped surface is preferably provided on a lip formed integrally with each guide rail, and the stop surface of each rail is defined by an inwardly facing surface formed by the guide wall, with the ramped surface facing the stop surface. The clamp member consists of a pair of spaced flanges with a web extending therebetween, and the clamp member first and second portions are defined by one of the clamp member flanges. An outer surface of a clamp member flange makes up the clamp member first portion, and the outer end of the clamp member flange makes up the clamp member second portion. With this arrangement, the outer end of the clamp member flange rides along the ramped surface when the screw is turned down in the clamp member to engage the rail, until the outwardly facing surface of the clamp member flange engages the stop surface defined by the inner surface of the guide wall.

The guide rail further includes a support surface defined by a second lip spaced from the first-mentioned lip, and the other of the clamp member flanges is engaged with the support surface. During movement of the outer end of the clamp member flange along the ramped surface, the other clamp member flange rides along the support surface. With this arrangement, engagement of the guide rail stop surface by the outwardly facing surface of the clamp member flange insures that the outer surfaces of the guide wall are in alignment when the guide rails are clamped together by engagement of the guide rails by the clamp member and the screws.

The invention further contemplates a method of assembling a cutting guide, consisting of a pair of guide rails and a connector member, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a end view of a prior art cutting guide assembly;

FIG. 2 is an isometric view, with portions broken away, of a cutting guide constructed according to the invention in assembled form;

FIG. 3 is a view similar to FIG. 1, showing the disassembled components of the cutting guide of FIG. 2;

FIG. 4 is a section view taken along line 4—4 of FIG. 2; and

FIG. 5 is an enlarged partial section view showing engagement of the clamp member flange with the ramped surface and the stop surface of one of the guide rails.

DETAILED DESCRIPTION

Prior Art

FIG. 1 illustrates a cutting guide assembly shown generally at 10, marketed under the designation "STRATE-CUT II" by the McGuire-Nicholas Company of Commerce, Cal.

Cutting guide assembly 10 generally consists of a pair of identical guide rails, such as shown at 12, placed in an end-to-end abutting relationship, with a connector plate, shown generally at 14, acting to secure the rails together. Each rail 12 consists of an inverted elongated U-shaped section, defined by an upper horizontal wall 16 and a pair of vertical side walls 18 and 20. An inwardly extending horizontal lip 22 is provided at the lower end of side wall 18, and a similar lip 24 is provided at the lower end of side wall 20. A clamping plate 26 is also interconnected with the lower end of side wall 20, and is coplanar with inwardly extending lip 24.

Connector plate 14 also defines a generally elongated inverted U-shape, consisting of an upper horizontal wall 26 and a pair of depending vertical flanges 28 and 30. A raised boss 32 is formed in upper wall 26, and spaced threaded passages are formed in boss 32 to receive the threaded shank 34 of threaded screws, such as shown generally at 36.

To assemble the rails in an end-to-end relationship, the rails are placed on their sides such that the outer guide surfaces, shown at 38, of vertical side walls 18 are placed on a flat surface to provide alignment of guide surfaces 38. Connector plate 14 is then placed into the channel defined by the rail sections, such that a portion of connector plate 14 is located in the channel defined by each rail. Connector plate 14 is placed such that at least one of the screws, such as 36, is engageable with each of the rail sections. After the guide surfaces 38 of the rail sections are aligned as described, the screws, such as 36, are turned down within the threaded passages formed in boss 32, until the ends of the screws engage the inner surface of the upper rail walls, such as 16. Continued turning down of the screws results in engagement of the upper surfaces of the lips, such as 22, 24, by the lower ends of connector plate flanges 28 and 30, and the rails are then frictionally engaged through connector plate 14.

While cutting guide assembly 10 as shown in FIG. 1 and described provides a low-cost construction, it is disadvantageous in that the user must manually insure that the guide surfaces, such as 38, of the rail sections are in alignment prior to connecting the rails together with connector plate 14. Such manual alignment of the guide surfaces is cumbersome, unreliable and time-consuming.

Present Invention

FIGS. 2-5 illustrate a cutting guide assembly 45 constructed according to the invention. Cutting guide assembly 45 consists generally of a pair of guide rails 48 and 50 adapted to be placed in an end-to-end abutting relationship with each other, with a clamping plate 52 (FIG. 3) for joining guide rails 48 and 50 together.

Guide rails 48 and 50 each have an identical cross-section, and reference is made to FIG. 4 for a detailed description of the cross-section of guide rail 48. Guide rail 48 is provided with a cross section defining a channel, including a vertical guide wall 54 defining an outer vertical guide surface 56 and an inwardly facing vertical stop surface 58. A horizontal lip 60 is provided at the lower end of guide wall 54, extending inwardly into the channel defined by guide rail 48. Lip 60 defines a lower, outer horizontal surface 62 and an inner, upwardly facing horizontal surface 64. Lip 60 terminates at its inward end in a vertical surface 66, and a ramped or inclined surface 68 extends between surfaces 64 and 66. Inclined surface 68 is disposed at an angle of approximately 30° relative to vertical.

An upper wall 70 extends rightwardly from the upper end of guide wall 54, defining an outer, upwardly facing surface 72 and a lower, inwardly facing surface 74. Upper wall 72 is interconnected at its rightward end with a vertical wall 76. Wall 76 is shorter in height than guide wall 54, and upper wall 70 is provided with a horizontal portion adjacent guide wall 54, which merges into an inclined portion which extends between the horizontal upper wall portion and the upper end of vertical wall 76.

Vertical wall 76 is connected at its lower end to an inwardly extending lip 78, which defines a horizontal upwardly facing support surface 80. A clamp flange, shown generally at 82, extends rightwardly of the lower end of vertical wall 76, and is coplanar with inwardly extending lip 78. Clamp flange 82 defines an upwardly facing horizontal surface 84. The lower surfaces of clamp flange 82 and lip 78 define a lower surface 86, which is coplanar with lower surface 62 defined by lip 60.

Rails 48, 50 and clamping plate 52 are formed of an extruded metal such as aluminum, in accordance with known procedures.

Referring again to FIG. 4, clamping plate 52 is generally in the form of an inverted channel, consisting of a pair of flanges, shown generally at 88 and 90, with a web, shown generally at 92, extending between flanges 88 and 90. Flange 88 defines an outwardly facing surface 94 and an inwardly facing surface 96, and terminates in an outer end 98. Flange 90 is constructed similarly to flange 88, and terminates in an outer end 100.

A boss, shown generally at 102, is formed on the lower surface of web 92, and two pairs of spaced threaded passages are formed in boss 102. Each of the threaded passages is adapted to receive a threaded shank 104 of a screw, shown generally at 106, which includes a head 108. The passages which receive the screws 106, are spaced apart from each other on clamping plate 52, such that when clamping plate 52 is placed in the channels defined by guide rails 48 and 50, one pair of screws is engageable with guide rail 48 and the other pair of screws is engageable with guide rail 50.

In operation, guide rails 48, 50 and clamping plate 52 are assembled into cutting guide assembly 45 as follows. The screws, such as 106, are first turned out in their respective threaded passages so as to allow clamping plate 52 to be slid into one or the other of guide rails 48, 50 with a portion of clamping plate 52 extending from the end of the guide rail. The other of guide rails 48, 50 is then slid over the outwardly extending portion of clamping plate 52 so that the ends of the guide rails abut each other, with clamping 52 spanning between guide rails 48, 50. At this time, end surface 98 of clamping plate flange 88 is engaged with the upper portion of inclined surface 68 provided on lip 60. Clamping plate 52 is then positioned such that the two pairs of screws 106 are spaced at approximately equal distances in from the ends of guide rails 48, 50. The screws 106 are then turned down within the threaded passages formed in boss 102, such that the ends of the screw shanks 104 engage inner surface 74 of the upper guide rail wall, such as shown at 70. Continued turning down of the screws 106 causes downward movement of clamping plate 52 relative to guide rails 48 and 50, resulting in end portion 98 of clamping plate flange 88 moving downwardly on inclined surface 68 of lip 60. During such movement of the flange end portion 98, end portion 100 of flange 90 engages supporting surface 80 of lip 78, and is drawn transversely thereon. The screws, such as 106, are continued to be turned down until outwardly facing surface 94 of clamping plate flange 88 engages stop surface 58 defined by guide wall 54. As shown in FIGS. 4 and 5, this occurs prior to end portion 98 of clamping member flange 88 engaging upwardly facing surface 64 defined by lip 60.

With the arrangement as shown and described, clamping plate 52 is frictionally engaged with guide rails 48 and 50, to thereby secure guide rails 48 and 50 together. With guide rails 48 and 50 being identically constructed, the vertical guide surface, such as 56, formed on guide rails 48 and 50 are aligned with each other when guide rails 48 and 50 are secured together, due to engagement of clamping plate flange outer surface 94 with the stop surfaces, such as 58, provided on both guide rails 48 and 50. This eliminates the need to manually align the guide surfaces prior to clamping the guide rails together.

Various alternatives and embodiments are contemplated as being within the scope of the following claims, particularly pointing out and distinctly claiming the subject matter regarded as the invention.

I claim:

1. A cutting guide, comprising:

a first guide rail defining a first guide wall;

a second guide rail defining a second guide wall;

the first and second guide rails being adapted for placement in an end-to-end relationship such that the outer surfaces of the first and second guide walls cooperate to form a continuous straight guide edge, each rail defining a channel and including a ramped surface and a stop surface disposed within the channel defined by the rail;

a clamp member for placement within the first and second guide rail channels, the clamp member including a first portion engageable with the ramped surface of each rail and a second portion engageable with the stop surface of each rail; and at least a pair of engagement members interconnected with the clamp member and engageable with the first and second guide rails under the application of force, wherein one of the engagement members is engageable with the first guide rail and the other of the engagement members is engageable with the second guide rail, wherein engagement of the first and second guide rails by the pair of engagement members under the application of force results in movement of the clamp member first portion along the ramped surfaces of the rails until engagement of the clamp member second portion with the stop surfaces of the rails, to securely hold the first and second guide rails together and to align the outer surfaces of the first and second guide walls to form a continuous straight guide edge.

2. The cutting guide of claim 1, wherein the ramped surfaces and the stop surfaces of the first and second rails are in substantially identical transverse locations on each rail relative to the rail guide walls, such that alignment of the ramped surfaces and the stop surfaces of each rail results in alignment of the outer surfaces of the first and second guide walls.

3. The cutting guide of claim 2, wherein the stop surface of each rail comprises an inwardly facing surface defining a wall of the channel, and wherein the ramped surface of each rail is provided on a lip associated with each rail, and wherein the ramped surface faces the stop surface.

4. The cutting guide of claim 2, wherein the clamp member comprises a pair of spaced flanges with a web extending therebetween, and wherein the clamp member first and second portions are defined by the clamp member flanges.

5. The cutting guide of claim 4, wherein the stop surface of each rail comprises an inwardly facing surface defined by the guide wall, and wherein the clamp member first portion is defined by an outwardly facing surface of a first one of the clamp member flanges, and the clamp member second portion is defined by an outer end of the first clamp member flange, and wherein the ramped surface of each rail is defined by a first inwardly extending lip provided on each rail, with the ramped surface facing the stop surface of each rail.

6. The cutting guide of claim 5, wherein the rail further includes a second inwardly extending lip, and wherein an outer end of the second clamp member flange is engageable with a support surface defined by the second inwardly extending lip, and wherein the second clamp member flange rides along the support surface during movement of the outer end of the first clamp member flange along the ramped surface.

7. The cutting guide of claim 1, further comprising a clamp flange formed integrally with the first and second guide rails to facilitate clamping of the guide rails to a workpiece.

8. The cutting guide of claim 1, wherein the engagement members comprise threaded screws disposed within spaced threaded passages formed in the clamp member, with the end of each screw engaging one of the guide rails upon turning down of the screw, to cause displacement of the clamp member relative to the rail and movement of the clamp member first portion along the ramped surfaces of the rails.

9. A cutting guide, comprising:

a pair of guide rails, each rail including:

a guide wall defining a straight substantially vertical outer edge;

a cross section defining a channel;

a stop surface located within the channel and defined by an inwardly facing surface of the guide wall;

a first inwardly extending lip interconnected with the guide wall and defining an inclined surface facing the stopped surface; and a second inwardly extending lip spaced from the first lip and defining a substantially horizontal support surface;

wherein the rails are adapted for placement in an end-to-end relationship such that the vertical outer edges of the rails cooperate to form a continuous straight edge;

a clamp member adapted for placement within the rail channels, the clamp member including a flange adapted for placement adjacent the stop surface of each guide rail, the flange having an outer end engageable with the inclined surface defined by the first lip, the clamp member further including a portion adapted for placement on the supporting surface defined by the second lip; and engagement means interposed between the clamp member and the pair of guide rails for causing relative movement therebetween to move the flange outer end along the inclined surface, and to cause engagement of the flange with the stop surface and movement of the clamp member along the support surface defined by the second lip, to securely hold the pair of guide rails together and to align the guide wall outer edges to form a continuous straight guide edge.

10. A method of assembling a cutting guide consisting of a pair of guide rails, each having a guide wall defining a straight substantially vertical outer edge, and a connector member, comprising the steps of:

forming each guide rail to a cross-section defining a channel;

providing an inclined surface and a stop surface within the channel defined by each guide rail;

placing the guide rails in an end-to-end abutting relationship;

placing the connector member within the channel defined by each guide rail such that an engagement surface provided on the connector member is engaged with the inclined surface provided within the channel defined by each guide rail;

causing relative movement between the connector member and the guide rails to provide movement of the connector member engagement surface along the rail inclined surfaces until engagement of the connector member with the stop surface provided by the channel defined by each guide rail; and maintaining the connector member in engagement with the stop surfaces to securely interconnect the guide rails together and to align the outer edges of each guide rail to form a continuous straight guide edge.

* * * * *